Sept. 27, 1938.                G. K. O'CONNOR                2,131,481
                                  REGULATOR
                              Filed Oct. 7, 1935              3 Sheets-Sheet 1

Inventor
George K. O'Connor
by McConkey & Booth
Attorneys

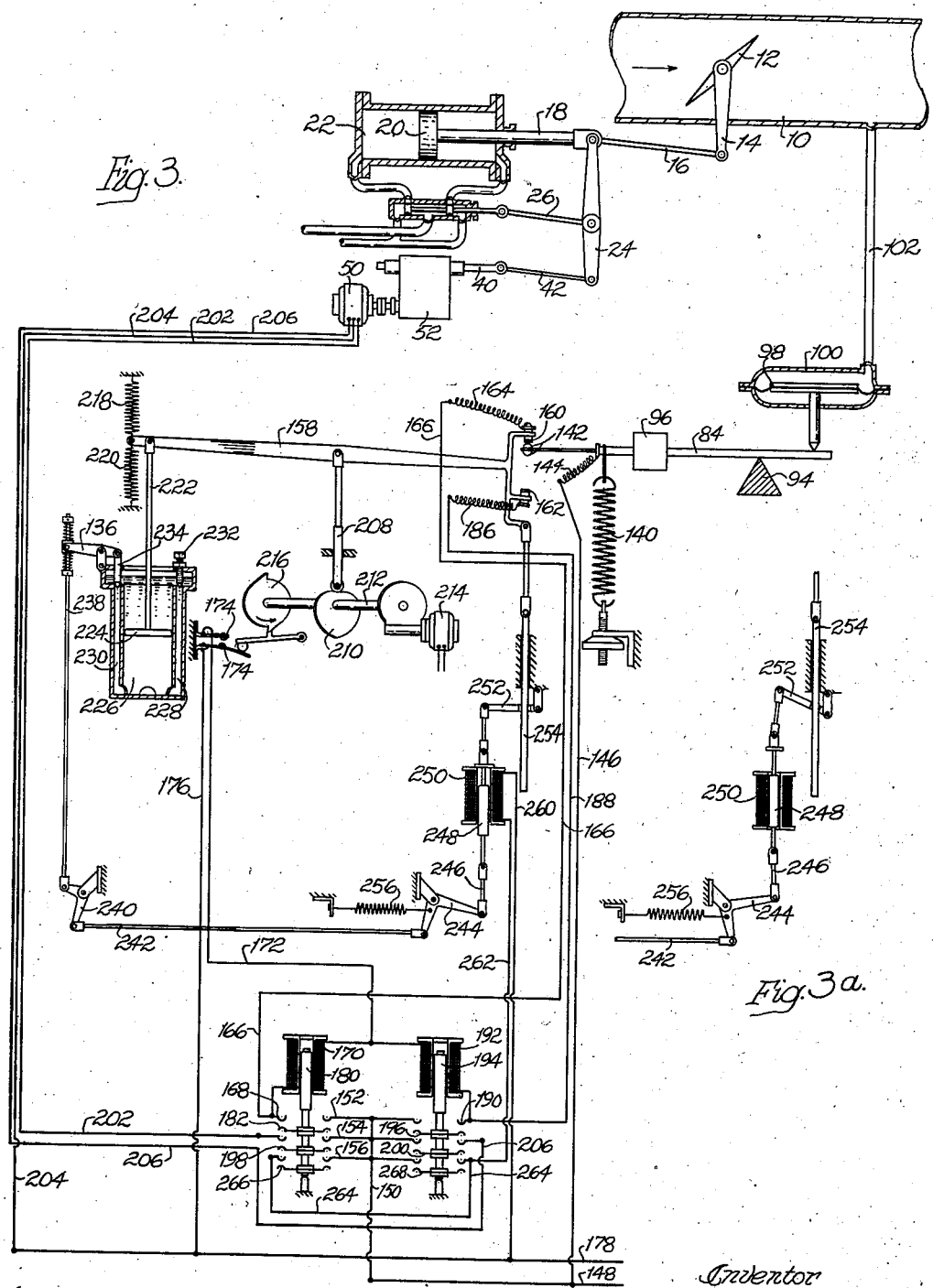

Sept. 27, 1938.    G. K. O'CONNOR    2,131,481
REGULATOR
Filed Oct. 7, 1935    3 Sheets-Sheet 3

Inventor
George K. O'Connor
by McConkey & Booth
Attorneys

Patented Sept. 27, 1938

2,131,481

UNITED STATES PATENT OFFICE 2,131,481

REGULATOR

George K. O'Connor, Evanston, Ill., assignor to Smoot Engineering Corporation, Chicago, Ill., a corporation of Delaware Application October 7, 1935, Serial No. 43,887

7 Claims. (Cl. 50—10)

This invention relates to regulators, such as are used for automatically controlling fluid flows and pressure and other similar variable conditions and quantities.

An object of the invention is to provide a regulator adapted to operate a valve or damper or the like by powerful hydraulic or air or other fluid pressure, and which is remotely controlled in a manner giving substantially an instantaneous response, preferably by an electric circuit.

In one desirable arrangement the remote control is connected to a reversible electric motor which operates through a reduction gearing or the like to shift return motion means such as a floating lever swung about its connection to the fluid-power actuator to open, in the correct direction, a pilot valve controlling that actuator, and then swung by the resultant operation of the actuator to close the pilot valve again.

Various features of the invention relate to controlling the circuits for the above-described motor. These circuits may be controlled manually, or automatically, and there may be a return indicator to apprise the operator that the desired control operation has taken place.

Where the regulator is controlled automatically, I prefer to use a novel mechanism, preferably electrically operated, utilizing an oscillated member having electric contacts, or other engaging control parts, engaging at times balance means such as a balance lever actuated by variations in pressure or other condition to be controlled. This contact-carrying member is shown continuously operated by power, and is in the form of a floating lever having the contacts at one end and a dashpot or the equivalent at the other end.

Various advantageous and novel features have to do with means for holding the contact-carrying end of the lever while the dashpot is shifted to a new position and then releasing the lever for oscillation about its dashpot connection as this shifts gradually back to normal position substantially as the balance means shifts back to normal as the required corrective change in pressure or other controllable condition is built up. Thus the device serves as a compensator for time lag in the change of the condition being controlled.

Since there is very little time lag in the apparatus itself, this adapts the regulator very well to installations where there is a considerable separation of the pressure-measuring means (or equivalent means for measuring a condition to be controlled) and the valve or other control device which is operated by the regulator.

The above and other objects and features of the invention, including various novel combinations of parts and desirable particular constructions, will be apparent from the following description of the illustrative embodiments shown in the accompanying drawings, in which:

Figure 3 is a diagram of the above-described automatic regulator with compensating means;

Figure 3a is a view of parts of Figure 3 in a different position; and

Figures 4, 5, 6, and 7 are diagrams showing the compensating means of Figure 3 in different positions.

Figure 1:
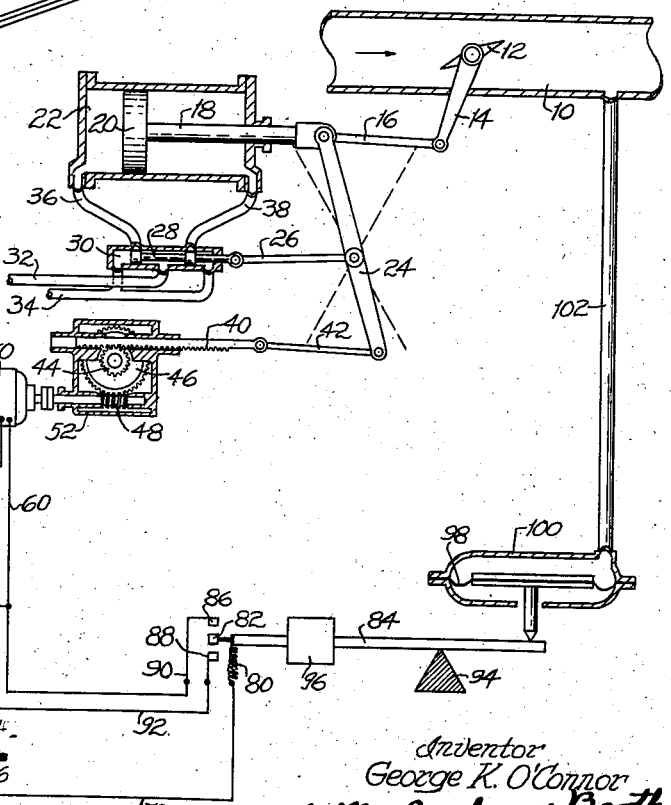
Figure 1 is a diagram of my novel regulator arranged with alternatively operable manual and automatic controls.

The regulator of Figure 1 is intended to control the flow of a fluid through a pipe 10, by operating a valve or damper 12 in the pipe. The valve 12 is operated by means such as an arm 14, mounted on the valve spindle outside the pipe, and connected by means such as a link 16 to the piston rod 18 of the piston 20 of a double-acting fluid actuator comprising, in combination with the piston, a hydraulic cylinder 22.

The piston rod 18 also has pivoted thereto return motion means such as a floating lever 24 which has connected thereto intermediate its ends a link or the equivalent 26 operatively connected to a pilot valve such as a valve slide 28 in a casing 30.

The casing 30 has at its center an intake connection 32 for liquid under pressure and at its ends it has overflow or drain connections 34. Opposite two shoulders or pistons on the slide 28, in normal valve closed position, are two ports communicating with conduits 36 and 38 leading to opposite ends of the hydraulic cylinder 22.

In the illustrated embodiment, the means for operating the lever 24 to control the opening of the valve comprises a rack 40 connected to the lower end of the lever by means such as a link 42. The rack 40 meshes with a small pinion 44 driven by a large worm gear 46 rotated by a worm 48 on the armature shaft of a reversible electric motor 50. The gearing 40—44—46—48, with its housing 52, forms a reduction gear connecting the motor 50 and the lever 24.

The motor 50 is controlled by electrical circuits shown as including a wire 54 leading to one side 56 of a source of electrical current, and two other wires 58 and 60 (for forward and reverse drive of the motor). A lead 62 from the other side 64 of the source of current is shown connected to a two-way switch 66.

When the switch 66 is swung upwardly to closed position it connects the lead 64 to a connection 68 leading to two contacts of two push-button switches having operating plungers 70 and 72 respectively, and the other contacts of which are connected by leads 74 and 76 to the wires 58 and 60. Thus closing one or the other of the switches 70 or 72 causes operation of the motor 50 in a corresponding direction, and shifts the rack 40 through a distance determined by the time the switch is held closed, causing a corresponding change in the position of the valve 12.

If the switch 66 is swung downwardly to closed position, it connects the lead 62 to a wire 78 connected through a flexible lead 80 to a contact 82 on a balance lever 84. The contact 82 is engaged, by movement of the lever 84 in one direction or the other from its normal horizontal position, with one or the other of two contacts 86 or 88 connected by leads 80 and 92 respectively to leads 60 and 58.

The balance lever 84 is mounted to swing on a suitable fulcrum 94, and is loaded with a spring or weight 96 to give the desired action, and is actuated by a weighted diaphragm or the like 98 in a casing 100 one side of which is connected by a conduit 102 to the pipe 10. Thus fluctuations in pressure in pipe 10 beyond the valve 12 swing lever 84 in one direction or the other to cause one or the other of the contacts 86 or 88 to engage the contact 82, thus driving the motor 50 in a corresponding direction and correspondingly moving the valve 12.

Figure 2:
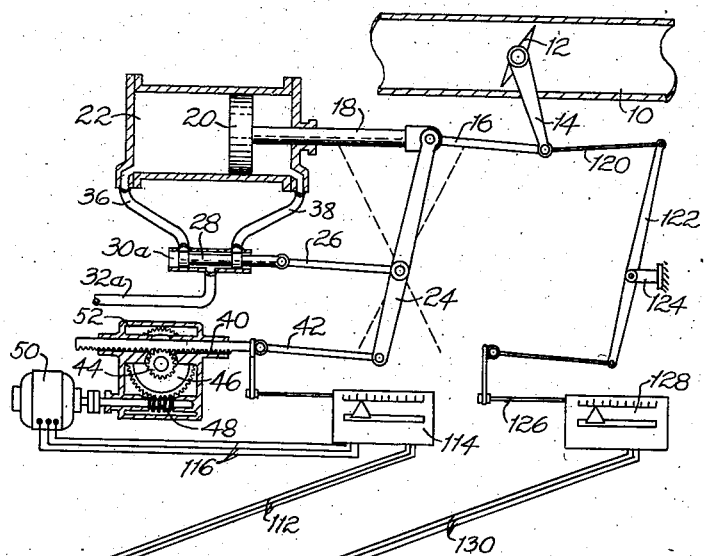
Figure 2 is a similar diagram showing a manual control with a return indicator.

In the arrangement of Figure 2 the motor 50 is controlled by a remote control electrical system such as is fully described in Smoot Patent No. 1,954,850, granted April 17, 1934. As the details of the remote control system itself form no part of my invention, I have merely shown diagrammatically at 110 the manually set sending instrument of such a system, connected by wires 112 to the receiving instrument 114 of the system, this in turn being operatively connected to the motor 50 by wires 116. The device shown in this figure is intended for operation by an elastic fluid such as compressed air carried by a supply conduit 32a, and consequently the return conduit 34 is omitted, casing 30a being open at its ends to exhaust into the atmosphere.

In this embodiment, in order that the operator (who may be at a considerable distance) may be absolutely sure that the desired adjustment has been made, the arm 14 is shown connected by means such as a link 120 with a lever 122 usually paralleling lever 24, and of the same proportions, but mounted on a fixed fulcrum 124. This lever 122 is shown linked to a connection 126 operating a second remote control sending instrument 128 connected by wires 130 with a receiving instrument 132 at the operator's station. Thus when the desired adjustment of valve 12 is made, the instrument 132 will show it.

Figures 3 to 7 illustrate an automatic control for the regulator. In this embodiment, the control or balance means such as lever 84, shown with both an adjustable weight 96 and a characteristic spring 140, carries a double contact 142 connected through a flexible lead 144 to a line 146 leading to one wire 148 of a source of electrical power. This same wire 148 is also connected by a lead 150 with three double contacts 152, 154, and 156 forming parts of two triple solenoid-operated switches described below.

A floating compensating lever 158 carries at one end spaced contacts 160 and 162 arranged on opposite sides of the contact 142. The contact 160 is connected by a flexible lead 164 to a line 166 leading to a contact 168 of one of the triple switches, and also connected through the solenoid 170 of the same switch to a line 172 connected to one of two yieldingly closed contacts 174 the other of which has a connection 176 leading to the other line 178 of the source of electrical power.

Thus it will be seen that engagement of contacts 142 and 160 closes the following two circuits (if contacts 174 are closed, viz.: (1) 148—146—144—142—160—164—166—170—172—174—176—178; and (since this energizes solenoid 170 and pulls upwardly on its core 180 to cause its upper contact 182 to bridge across and connect contacts 168 and 152) a holding circuit (2) 148—150—152—182—168—170—172—174—176—178. Both of these circuits are opened by the separation of contacts 174, which thereupon opens the connection 152—182—168 by de-energization of the solenoid 170.

The contact 162 is connected through a flexible lead 186 with a line 188 leading to the upper contact 190 of the other one of the solenoid switches, and thence through the solenoid 192 of that switch and through the above-described line 172, contacts 174, line 176, to the other side 178 of the source of power. This (if contacts 174 are closed) energizes solenoid 192, lifting its core 194, causing the upper contact 196 to bridge across and establish a connection between contacts 190 and 152. This establishes a holding circuit 148—150—152—196—190—192—172—174—176—178. Like the first holding circuit, this is broken by the separation of contacts 174.

The second contacts 198 and 200, of the solenoid cores 180 and 194 respectively, both are engageable with the second set of contacts 154 connected by lead 150 to current source 148. The contact 198, when closed, connects contact 154 (and therefore source 148) to a connection 202 which cooperates with a connection 204 from the other side 178 of the current source to drive the reversible motor 50 in one direction. Similarly contact 200, when closed, connects the contact 154 with a motor connection 206 which cooperates with the connection 204 to drive the motor 50 in the opposite direction.

The balance lever 158 has between its ends means for continuously oscillating the lever about one or the other of its ends. This means is illustrated as a plunger 208 pressed downwardly by means such as a suitable spring (not shown) and reciprocated upwardly by a cam 210 or the like operated by a shaft 212 continuously driven by a motor 214. The shaft 212 is shown as also carrying a double cam 216 which separates the contacts 174 twice during each revolution of the shaft 212.

The left-hand end of lever 158 is urged to its normal central position by balanced springs 218 and 220. This end of the lever 158 is also pivoted to the rod 222 of a dashpot piston 224 movable in a fixed dashpot cylinder 226. The top and bottom of the cylinder 226 communicate through two passages 228 and 230. The passage 228 is controlled by a manually adjustable needle valve 232, permitting the usual slow dashpot movement to piston 224.

The passage 230 is opened and closed by a valve 234 operated by a lever 236 yieldingly connected to an operating rod 238 actuated through connections shown as including a bellcrank 240 and a link 242 and a second bellcrank 244 and another link 246, by a core 248 in a solenoid 250. The core 250 is also connected, at its upper end, to a clamp or brake 252, fulcrumed on a pivoted link to be swung upwardly as shown in Figure 3a to grip and hold a plunger 254 linked to the right-hand end of the compensating lever 158. The connections may be provided with a return spring 256.

The solenoid 250, which when energized opens the passage 230 and simultaneously actuates the clamp 252 to grip and hold the plunger 254, is provided with a connection 260 direct from one line 178 of the source of power, and a connection 262, with a shunt 264, so arranged as to connect it with the lower contacts of both of the triple solenoid switches, and adapted to be connected to the contact 156 (and therefore line 148) when either core 180 or 194 lifts its lowermost contact 266 or 268.

It will be noted that when solenoid 250 is energized, the compensating lever 158 oscillates about its righthand end, plunger 254 being held and passage 230 being wide open, whereas when the solenoid 250 is de-energized the lever 158 oscillates about its left end, which is then held (yieldingly, to be sure) by the dashpot while plunger 254 is released.

Figure 4:
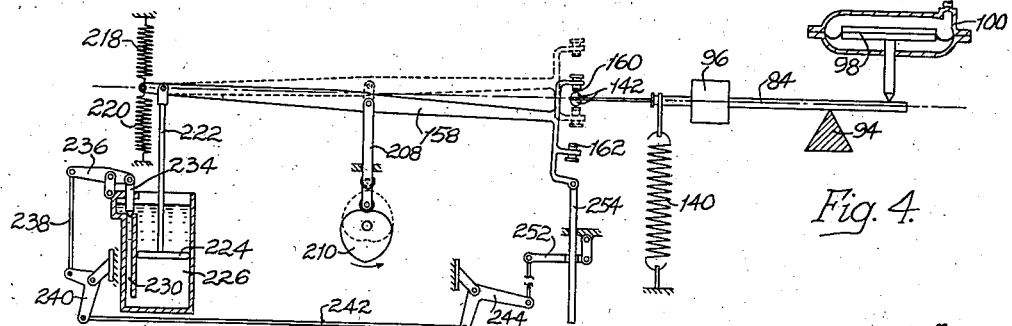

The operation of the above-described compensating means is illustrated in Figures 4 to 7. Normally, with balance lever 84 horizontal as shown in Figure 4, lever 158 oscillates idly, motor 50 is idle, and all of the circuits are open. The lever 158 at this time oscillates about its left end, but not far enough to cause engagement of either contact 160 or 162 with contact 142.

Figure 5:
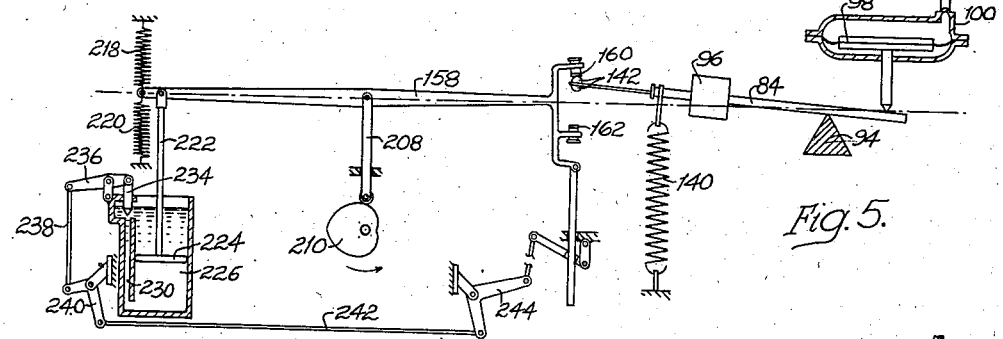

If the condition being controlled should depart from normal, as for example in a manner swinging the contact 142 upwardly as illustrated in Figure 5, contacts 160 and 142 engage on the next oscillation of lever 158. This energizes solenoid 170, and closes (1) the holding circuit through that solenoid, (2) one of the motor circuits, and (3) the circuit through solenoid 250. This is shown in Figure 5.

Figure 6:
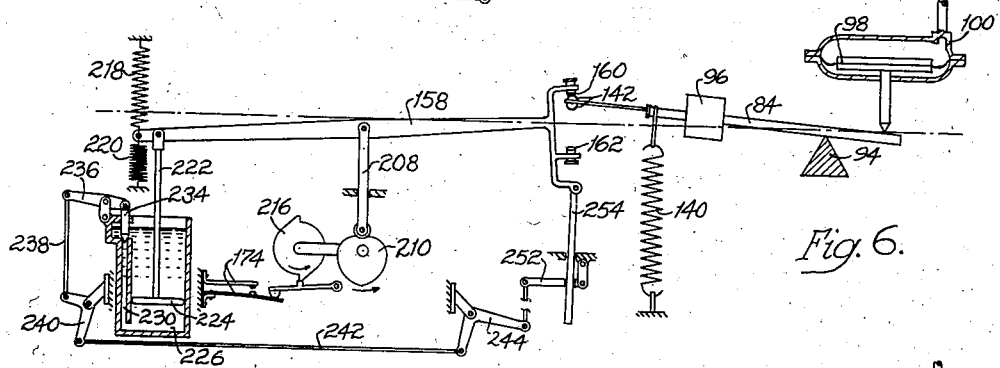

The lever 158 now starts to oscillate about its right end, until the next separation of the contacts 174 opens all of the circuits, during which time motor 50 is running and the piston 224 is shifted to some new position illustrated in Figure 6.

Figure 7:
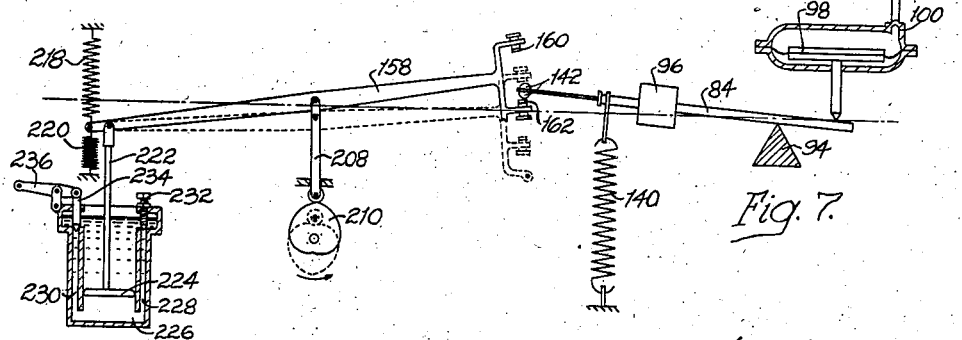

The lever 158 now again oscillates about its left end, but due to the new position of piston 224 its oscillation is about a new mean position, and this is such that again neither of the contacts 160 or 162 engages the contact 142, in spite of the new position of the latter. This is illustrated in Figure 7.

As the resultant pressure in casing 100 (or other condition being controlled) gradually builds up to return to its original value, dependent on the new position of valve 12, the balance lever 84 gradually is returned to its original horizontal position of Figure 4, while concurrently therewith the spring 218 and the dashpot 224—226 gradually return the lever 158 to its original position, where it oscillates in a zone whose mean is a horizontal line, as shown in Figure 4.

Thus any deviation from normal of the condition being controlled closes either contacts 160—142 or 162—142, operating motor 50 in a corresponding direction for not more than one-half the time of a revolution of shaft 212. If the resultant correction is not sufficient, or if it overshoots, there will be a subsequent further correction in a corresponding sense. The described compensating mechanism compensates for time lag in the response, and prevents "hunting."

While several illustrative embodiments have been described in detail, it is not my intention to limit the scope of my invention to those particular embodiments, or otherwise than by the terms of the appended claims.

The present invention is junior to, and from some points of view may be regarded as an improvement on, the invention of Charles H. Smoot, deceased, covered by application No. 59,574, filed January 17, 1936, by Katherine E. Smoot, executrix of the estate of said Charles H. Smoot.

I claim:

1. A regulator comprising a fluid-power actuator having an electric control device, balance means actuated by the condition to be controlled and provided with an electric contact, a power-oscillated floating lever having normally-oscillating spaced contacts on opposite sides of said first contact and which do not engage said first contact when the balance means is in its normal position and one or the other of which engages the first contact when the balance means shifts out of its normal position, circuits for oppositely actuating the electric control device and which are connected through said spaced contacts respectively, a fluid dashpot connected to the lever, means for holding the spaced contacts and shifting the dashpot connection to a new position without substantial resistance from the dashpot when either of said circuits is closed, and means operating when the circuit is thereafter opened to shift the dashpot connection gradually against the resistance of the dashpot back to its initial position, while at the same time permitting the oscillation of the spaced contacts.

2. A regulator comprising balance means actuated by the condition to be controlled and provided with an electric contact, a power-oscillated floating lever having normally-oscillating spaced contacts on opposite sides of said first contact and which do not engage said first contact when the balance means is in its normal position and one or the other of which engages the first contact when the balance means shifts out of its normal position, control circuits which are connected through said spaced contacts respectively, a fluid dashpot connected to the lever, means for holding the spaced contacts and shifting the dashpot connection to a new position without substantial resistance from the dashpot when either of said circuits is closed, and means operating when the circuit is thereafter opened to shift the dashpot connection gradually against the resistance of the dashpot back to its initial position, while at the same time permitting the oscillation of the spaced contacts.

3. Actuating mechanism for a regulator or the like comprising a floating lever, power-actuated means engaging the lever between its ends and oscillating the lever about whichever end most resists movement, a pair of spaced contacts at one end of the lever, balance means actuated by the condition to be controlled and having a contact between the spaced contacts, control circuits both connected to said last contact and connected respectively to the spaced contacts, a dashpot connected to the other end of the lever and which has a by-pass which can be opened to eliminate dashpot resistance, means for gradually returning said other end of the lever from any position into which it has been moved to a central position against the resistance of the dashpot whenever the end carrying the contacts is free to oscillate, means actuated whenever either circuit is closed to hold the end of the lever carrying the contacts against oscillation, and means operated whenever either circuit is closed to open said by-pass.

4. Actuating mechanism for a regulator or the like comprising a floating lever, power-actuated means engaging the lever between its ends and oscillating the lever about whichever end most resists movement, a pair of spaced engaging parts at one end of the lever, balance means actuated by the condition to be controlled and having an engaging part between the spaced parts, control means actuated by engagement of said parts, a dashpot connected to the other end of the lever and which has a by-pass which can be opened to eliminate dashpot resistance, means for gradually returning said other end of the lever from any position into which it has been moved to a central position against the resistance of the dashpot whenever the end carrying said parts is free to oscillate, means actuated whenever said parts are engaged to hold the end of the lever carrying said parts against oscillation, and means operated whenever said parts are engaged to open said by-pass.

5. Actuating mechanism for a regulator or the like comprising balance means having an engaging part shifted by changes in the condition to be controlled, an oscillating lever having spaced engaging parts on opposite sides of the first part and one or the other of which engages the first part when it is shifted, means for shifting the zone of oscillation of the spaced parts so that the first part in its shifted position is midway thereof, and means for graually returning said zone of oscillation to its original position.

6. Actuating mechanism for a regulator or the like comprising balance means having an engaging part shifted by changes in a condition to be controlled, power-operated feeler means including two other parts swung toward and from said engaging part and one or the other of which engages said first part when it is shifted, dashpot means determining the zone of oscillation of said other parts, and means rendered effective by engagement of the first part with one or the other of the said two parts to shift the dashpot means to a new position corresponding to the shifted position of said first part to change said zone of oscillation accordingly and then permitting the dashpot means gradually to return said zone of oscillation gradually to its initial position.

7. Actuating mechanism for a regulator or the like comprising balance means having an engaging part having an electric contact shifted by changes in a condition to be controlled, power-operated feeler means including two other parts having contacts swung toward and from said first contact and one or the other of which engages said first contact when it is shifted, dashpot means determining the zone of oscillation of said other parts, means rendered effective by engagement of the first contact with one or the other of the said two contacts to shift the dashpot means to a new position corresponding to the shifted position of said first part to change said zone of oscillation accordingly and then permitting the dashpot means gradually to return said zone of oscillation gradually to its initial position, and a control circuit opened and closed by engagament and disengagement of said contacts.

GEORGE K. O'CONNOR.